(12) United States Patent
Niimi

(10) Patent No.: US 8,589,052 B2
(45) Date of Patent: Nov. 19, 2013

(54) VEHICLE CONTROL SYSTEM

(75) Inventor: Kuniaki Niimi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 570 days.

(21) Appl. No.: 12/956,581

(22) Filed: Nov. 30, 2010

(65) Prior Publication Data

US 2011/0139096 A1 Jun. 16, 2011

(30) Foreign Application Priority Data

Dec. 10, 2009 (JP) ................... 2009-280161

(51) Int. Cl.
F02B 63/00 (2006.01)
F02D 41/00 (2006.01)
H02P 9/10 (2006.01)

(52) U.S. Cl.
USPC .................. 701/102; 701/22; 180/65.285

(58) Field of Classification Search
USPC ......... 701/102, 101, 112, 111, 115; 180/65.1, 180/65.265, 65.285; 123/2; 322/22, 23, 33, 322/34
See application file for complete search history.

(56) References Cited

U.S. PATENT DOCUMENTS 5,801,499 A * 9/1998 Tsuzuki et al. .......... 180/65.285
7,538,523 B2 * 5/2009 Kitamura et al. ............... 322/33

FOREIGN PATENT DOCUMENTS

| JP | A-2-142329 | 5/1990 |
| JP | A-08-168103 | 6/1996 |
| JP | A-2000-308201 | 11/2000 |
| JP | A-2000-324609 | 11/2000 |
| JP | A-2003-134608 | 5/2003 |
| JP | A-2006-193137 | 7/2006 |
| JP | A-2008-162367 | 7/2008 |

OTHER PUBLICATIONS

Japanese Office Action issued in Japanese Patent Application No. 2009-280161 dated Nov. 1, 2011 (with translation).

* cited by examiner

*Primary Examiner* — Hieu T Vo
(74) *Attorney, Agent, or Firm* — Oliff & Berridge, PLC

(57) ABSTRACT

A control system for a vehicle that is equipped with an internal combustion engine and a generator driven by the internal combustion engine to generate electric power and that is able to supply an external device with electric power generated by the generator during a stop of the vehicle includes: a detecting unit that detects a coolant temperature of the internal combustion engine; and an efficiency control unit that controls the internal combustion engine so that, during a stop of the vehicle, an operating state of the internal combustion engine approaches an operating state where an efficiency of the internal combustion engine becomes a predetermined efficiency as a difference between the coolant temperature and a predetermined upper limit temperature increases.

11 Claims, 8 Drawing Sheets

VEHICLE CONTROL SYSTEM

INCORPORATION BY REFERENCE

The disclosure of Japanese Patent Application No. 2009-280161 filed on Dec. 10, 2009 including the specification, drawings and abstract is incorporated herein by reference in its entirety.

BACKGROUND OF THE INVENTION

1. Field of the Invention

The invention relates to a vehicle control system and, more specifically, to a technique for controlling an internal combustion engine when electric power generated using the power of the internal combustion engine is supplied to a device outside a vehicle during a vehicle stop.

2. Description of the Related Art

There is known a hybrid vehicle that is equipped with an internal combustion engine and an electric motor and that is able to run by driving force from at least one of the internal combustion engine and the electric motor. The hybrid vehicle is able to generate electric power by an electric motor or a generator using power from the internal combustion engine. Generated electric power is mostly consumed in running of the hybrid vehicle. In addition, as described in Japanese Patent Application Publication No. 2-142329 (JP-A-2-142329), it has been proposed that a generator equipped for a hybrid vehicle is used as a home emergency power.

Incidentally, during a vehicle stop, the air cooling performance of an engine decreases as compared with that during running. However, JP-A-2-142329 describes nothing about a method of compensating for decreased cooling performance.

SUMMARY OF THE INVENTION

The invention provides a technique for operating an internal combustion engine during a vehicle stop while ensuring the cooling performance of the internal combustion engine.

An aspect of the invention relates to a control system for a vehicle that is equipped with an internal combustion engine and a generator driven by the internal combustion engine to generate electric power and that is able to supply an external device with electric power generated by the generator during a stop of the vehicle. The control system includes: a detecting unit that detects a coolant temperature of the internal combustion engine; and an efficiency control unit that controls the internal combustion engine so that, during a stop of the vehicle, an operating state of the internal combustion engine approaches an operating state where an efficiency of the internal combustion engine becomes a predetermined efficiency as a difference between the coolant temperature and a predetermined upper limit temperature increases.

With the above configuration, the internal combustion engine is controlled in a feedback manner on the basis of a coolant temperature. The internal combustion engine is controlled so that, during a vehicle stop, an operating state of the internal combustion engine approaches an operating state where an efficiency of the internal combustion engine becomes a predetermined efficiency as a difference between the coolant temperature and a predetermined upper limit temperature increases. By so doing, when the coolant temperature of the internal combustion engine is low, the internal combustion engine may be operated in an operating state that achieves a desired efficiency. On the other hand, when the coolant temperature of the internal combustion engine is high, the operating state of the internal combustion engine may be, for example, varied so that the amount of heat emitted to the coolant reduces. Therefore, it is possible to restrict an increase in coolant temperature. As a result, the internal combustion engine may be operated while keeping the cooling performance of the internal combustion engine during a stop of the vehicle.

In the control system, the efficiency control unit may control the internal combustion engine so that a power of the internal combustion engine decreases as the difference between the coolant temperature and the upper limit temperature reduces.

With the above configuration, as the coolant temperature increases, the power of the internal combustion engine is decreased. By so doing, it is possible to reduce the amount of heat emitted from the internal combustion engine to the coolant. Therefore, it is possible to restrict an increase in coolant temperature.

The control system may further include a changing unit that increases the upper limit temperature when the vehicle is stopped and electric power generated by the generator is being supplied to a device outside the vehicle as compared with when the vehicle is running.

With the above configuration, while the vehicle is stopped and electric power generated by the generator is being supplied to a device outside the vehicle, the upper limit temperature is increased. By so doing, it is possible to expand a range in which the internal combustion engine is operated in an operating state that achieves a desired efficiency.

In the control system, the predetermined efficiency may be a maximum efficiency of the internal combustion engine.

With the above configuration, it is possible to control the internal combustion engine so that the efficiency becomes the highest. Therefore, it is possible to minimize the amount of heat emitted from the internal combustion engine to the coolant. As a result, it is possible to restrict an increase in coolant temperature within a necessary minimum.

In the control system, the efficiency control unit may control the internal combustion engine so that an operating state of the internal combustion engine varies in accordance with a condition determined in consideration of a fuel consumption rate of the internal combustion engine.

With the above configuration, the operating state of the internal combustion engine varies so as to satisfy a condition determined in connection with a fuel consumption rate. Therefore, for example, it is possible to vary the operating state so that the fuel consumption rate becomes minimum. As a result, it is possible to reduce the fuel consumption rate to a necessary minimum.

The control system may further include an NV control unit that controls the internal combustion engine so that an operating state of the internal combustion engine varies in accordance with a first condition determined in consideration of at least any one of noise and vibration of the vehicle while the vehicle is running, wherein the efficiency control unit may control the internal combustion engine so that an operating state of the internal combustion engine varies in accordance with a second condition determined in consideration of a fuel consumption rate of the internal combustion engine instead of the first condition when the vehicle is stopped and electric power generated by the generator is being supplied to a device outside the vehicle.

With the above configuration, while the vehicle is running, the operating state of the internal combustion engine varies so as to satisfy a condition determined in connection with noise and/or vibration of the vehicle. Therefore, it is possible to, for example, vary the operating state so that noise and/or vibration of the vehicle falls within an allowable range. On the other hand, when the vehicle is stopped and electric power is being supplied from the vehicle to an external device, it is less necessary to reduce noise and vibration because no driver, or the like, gets on the vehicle. Thus, when the vehicle is stopped and electric power generated by the generator is being supplied to a device outside the vehicle, the operating state of the internal combustion engine varies so as to satisfy a condition determined in connection with the fuel consumption rate of the internal combustion engine instead of a condition determined in connection with noise and/or vibration of the vehicle. Therefore, it is possible to give a higher priority to the fuel consumption rate than noise and vibration. For example, it is possible to vary the operating state of the internal combustion engine so that the fuel consumption rate becomes minimum. As a result, it is possible to reduce the fuel consumption rate to a necessary minimum.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
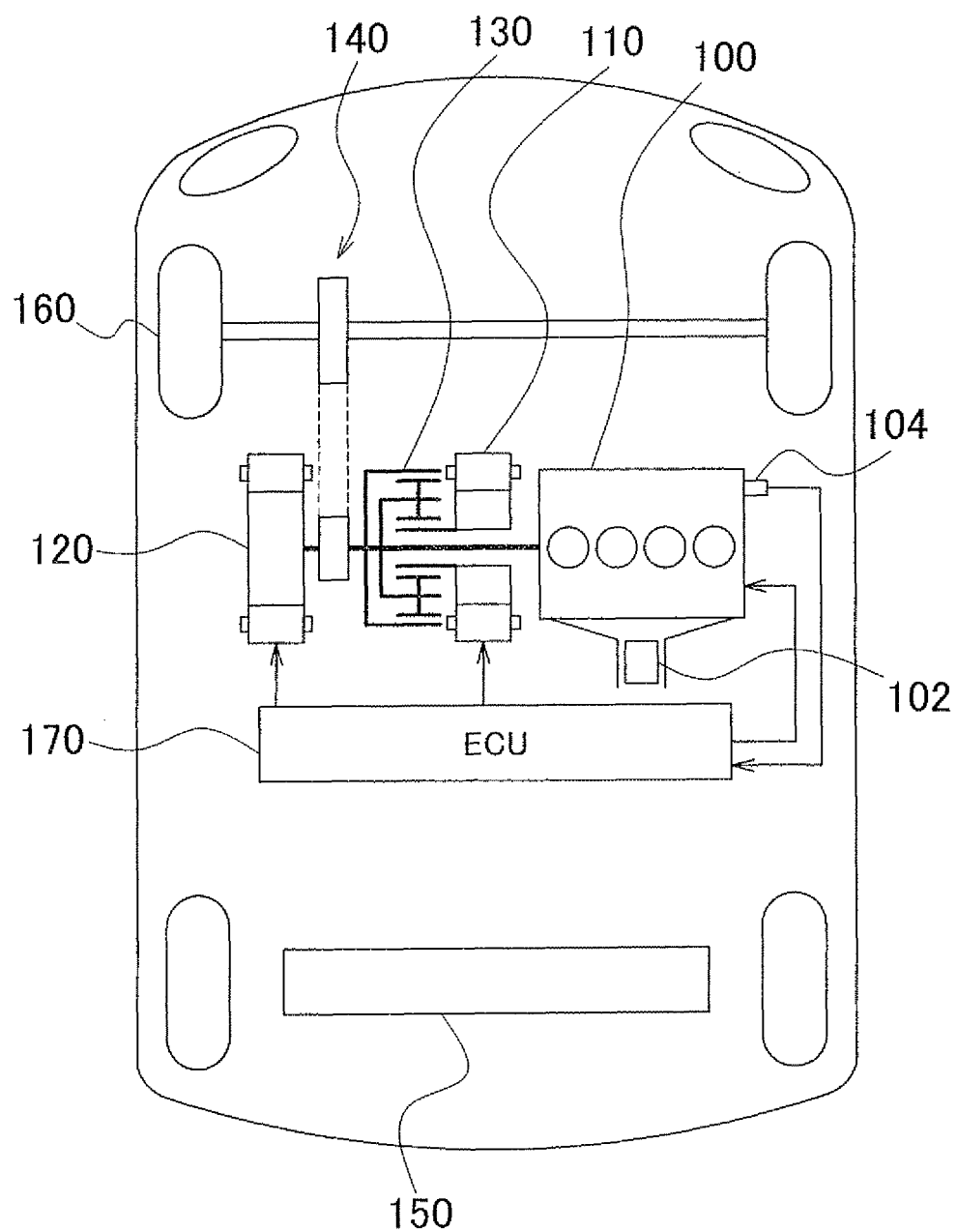
FIG. 1 is a schematic configuration diagram that shows a plug-in hybrid vehicle according to an embodiment of the invention.

Hereinafter, an embodiment of the invention will be described with reference to the accompanying drawings. In the following description, like reference numerals denote the same components. The names and functions of them are also the same. Therefore, the detailed description thereof will not be repeated.

As shown in FIG. 1, a plug-in hybrid vehicle includes an engine 100, a first motor generator (MG) 110, a second motor generator (MG) 120, a power split mechanism 130, a reduction gear 140 and a battery 150. The plug-in hybrid vehicle according to the present embodiment is equipped with the engine 100 and an electric motor (second MG 120) as driving sources.

The engine 100, the first MG 110, the second MG 120 and the battery 150 are controlled by an electronic control unit (ECU) 170. Note that the ECU 170 may be divided into a plurality of ECUs.

The vehicle runs by driving force from at least any one of the engine 100 and the second MG 120. That is, any one of or both of the engine 100 and the second MG 120 are automatically selected as the driving sources in accordance with an operating state.

The engine 100 is an internal combustion engine. A mixture of fuel and air is burned in a combustion chamber to thereby rotate a crankshaft that is an output shaft. Exhaust gas from the engine 100 is purified by a catalyst 102 and is then emitted outside the vehicle.

The engine 100 is cooled by coolant. The temperature of coolant is detected by a temperature sensor 104. A signal that indicates the result detected by the temperature sensor 104 is input to the ECU 170. Normally, the engine 100 is controlled so that the coolant temperature is lower than or equal to a predetermined upper limit temperature. For example, when the coolant temperature reaches the upper limit temperature, a radiator fan is controlled to rotate.

The engine 100, the first MG 110 and the second MG 120 are connected to one another via the power split mechanism 130. Power generated by the engine 100 is split by the power split mechanism 130 into two paths. One of the two paths is a path that drives front wheels 160 via the reduction gear 140. The other one of the two paths is a path that generates electric power by driving the first MG 110.

The first MG 110 is a three-phase alternating current rotating electrical machine that includes a U-phase coil, a V-phase coil and a W-phase coil. The first MG 110 generates electric power by the power of the engine 100, split by the power split mechanism 130. Electric power generated by the first MG 110 is differently used depending on the running state of the vehicle or the state of charge of the battery 150. For example, during normal running, electric power generated by the first MG 110 directly drives the second MG 120. On the other hand, when the state of charge (SOC) of the battery 150 is lower than a predetermined value, electric power generated by the first MG 110 is converted by an inverter (discussed later) from alternating current into direct current. After that, the voltage is adjusted by a converter (discussed later) and is stored in the battery 150.

When the first MG 110 is operating as a generator, the first MG 110 generates negative torque. Here, the negative torque means a torque that becomes a load on the engine 100. When the first MG 110 is supplied with electric power to be operating as a motor, the first MG 110 generates positive torque. Here, the positive torque means a torque that does not become a load on the engine 100, that is, a torque that assists rotation of the engine 100. Note that this also applies to the second MG 120.

The second MG 120 is a three-phase alternating current rotating electrical machine that includes a U-phase coil, a V-phase coil and a W-phase coil. The second MG 120 is driven by at least any one of electric power stored in the battery 150 and electric power generated by the first MG 110.

Driving force of the second MG 120 is transmitted to the front wheels 160 via the reduction gear 140. By so doing, the second MG 120 assists the engine 100 or the vehicle is caused to run by driving force from the second MG 120. Note that rear wheels may be driven instead of or in addition to the front wheels 160.

During regenerative braking of the plug-in hybrid vehicle, the second MG 120 is driven by the front wheels 160 via the reduction gear 140 to operate as a generator. By so doing, the second MG 120 operates as a regenerative brake that converts braking energy into electric power. Electric power generated by the second MG 120 is stored in the battery 150.

The power split mechanism 130 is formed of a planetary gear unit that includes a sun gear, pinion gears, a carrier and a ring gear. The pinion gears are in mesh with the sun gear and the ring gear. The carrier supports the pinion gears so as to be rotatable on its axis. The sun gear is coupled to the rotary shaft of the first MG 110. The carrier is coupled to the crankshaft of the engine 100. The ring gear is coupled to the rotary shaft of the second MG 120 and the reduction gear 140.

The engine 100, the first MG 110 and the second MG 120 are coupled to one another via the power split mechanism 130 formed of the planetary gear unit. Thus, the number of rotations of any one of the engine 100, the first MG 110 and the second MG 120 is determined on the basis of the numbers of rotations of the other two of the engine 100, the first MG 110 and the second MG 120 in accordance with the gear ratio of the planetary gear unit.

The battery 150 is a battery pack that is formed so that a plurality of battery modules, each of which integrates a plurality of battery cells, are further serially connected. The voltage of the battery 150 is, for example, about 200 V. The battery 150 is charged with electric power supplied from not only the first MG 110 and the second MG 120 but also a power supply outside the vehicle. Note that a capacitor may be used instead of or in addition to the battery 150.

Figure 2:
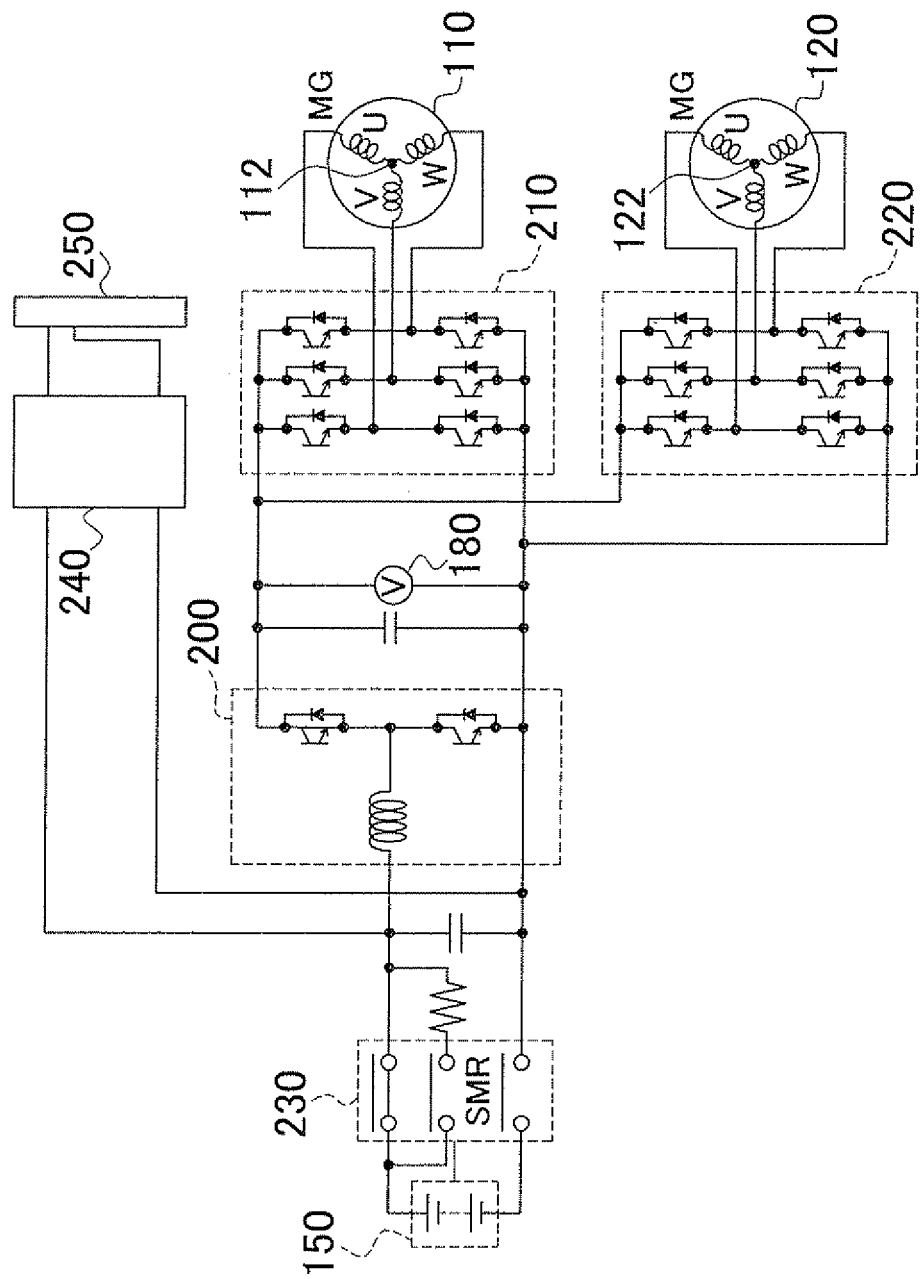
FIG. 2 is a first view of an electrical system of the plug-in hybrid vehicle according to the embodiment of the invention.

The electrical system of the plug-in hybrid vehicle will be further described with reference to FIG. 2. The plug-in hybrid vehicle includes a converter 200, a first inverter 210, a second inverter 220, a system main relay (SMR) 230, a charger 240 and an inlet 250.

The converter 200 includes a reactor, two npn transistors and two diodes. One end of the reactor is connected to the positive electrodes of the batteries, and the other end of the reactor is connected to a connecting point of the two npn transistors.

The two npn transistors are serially connected. The npn transistors are controlled by the ECU 170. A diode is connected between the collector and emitter of each of the npn transistors so as to conduct current from the emitter to the collector.

Note that the npn transistor may be, for example, an insulated gate bipolar transistor (IGBT). Instead of the npn transistor, an electric power switching element, such as a power metal oxide semiconductor field-effect transistor (MOS-FET), may be used.

When electric power discharged from the battery 150 is supplied to the first MG 110 or the second MG 120, the voltage is stepped up by the converter 200. On the other hand, when electric power generated by the first MG 110 or the second MG 120 is charged to the battery 150, the voltage is stepped down by the converter 200.

A system voltage VH between the converter 200 and each inverter is detected by a voltage sensor 180. The result detected by the voltage sensor 180 is transmitted to the ECU 170.

The first inverter 210 includes a U-phase arm, a V-phase arm and a W-phase arm. The U-phase arm, the V-phase arm and the W-phase arm are connected in parallel with one another. Each of the U-phase arm, the V-phase arm and the W-phase arm includes two serially connected npn transistors. A diode is connected between the collector and emitter of each npn transistor so as to conduct current from the emitter to the collector. Then, the connecting point of the npn transistors of each arm is connected to an end different from a neutral point 112 of the coils of the first MG 110.

The first inverter 210 converts direct current, supplied from the battery 150, into alternating current and then supplies the alternating current to the first MG 110. In addition, the first inverter 210 converts alternating current, generated by the first MG 110, into direct current.

The second inverter 220 includes a U-phase arm, a V-phase arm and a W-phase arm. The U-phase arm, the V-phase arm and the W-phase arm are connected in parallel with one another. Each of the U-phase arm, the V-phase arm and the W-phase arm includes two serially connected npn transistors. A diode is connected between the collector and emitter of each of the npn transistors so as to conduct current from the emitter to the collector. Then, the connecting point of the npn transistors of each atm is connected to an end different from a neutral point 122 of the coils of the second MG 120.

The second inverter 220 converts direct current, supplied from the battery 150, into alternating current and then supplies the alternating current to the second MG 120. In addition, the second inverter 220 converts alternating current, generated by the second MG 120, into direct current.

The converter 200, the first inverter 210 and the second inverter 220 are controlled by the ECU 170.

The SMR 230 is provided between the battery 150 and the charger 240. The SMR 230 is a relay that switches between a connected state where the battery 150 is connected to the electrical system and an interrupted state where the battery 150 is interrupted from the electrical system. When the SMR 230 is open, the battery 150 is interrupted from the electrical system. When the SMR 230 is closed, the battery 150 is connected to the electrical system.

That is, when the SMR 230 is open, the battery 150 is electrically interrupted from the converter 200, the charger 240, or the like. When the SMR 230 is closed, the battery 150 is electrically connected to the converter 200, the charger 240, and the like.

The status of the SMR 230 is controlled by the ECU 170. For example, as the ECU 170 starts up, the SMR 230 is closed. When the ECU 170 shuts down, the SMR 230 is opened.

The charger 240 is connected between the battery 150 and the converter 200. The charger 240 converts alternating-current power into direct-current power and also steps up the voltage in order to charge the battery 150. The charger 240 is controlled by the ECU 170.

Figure 3:
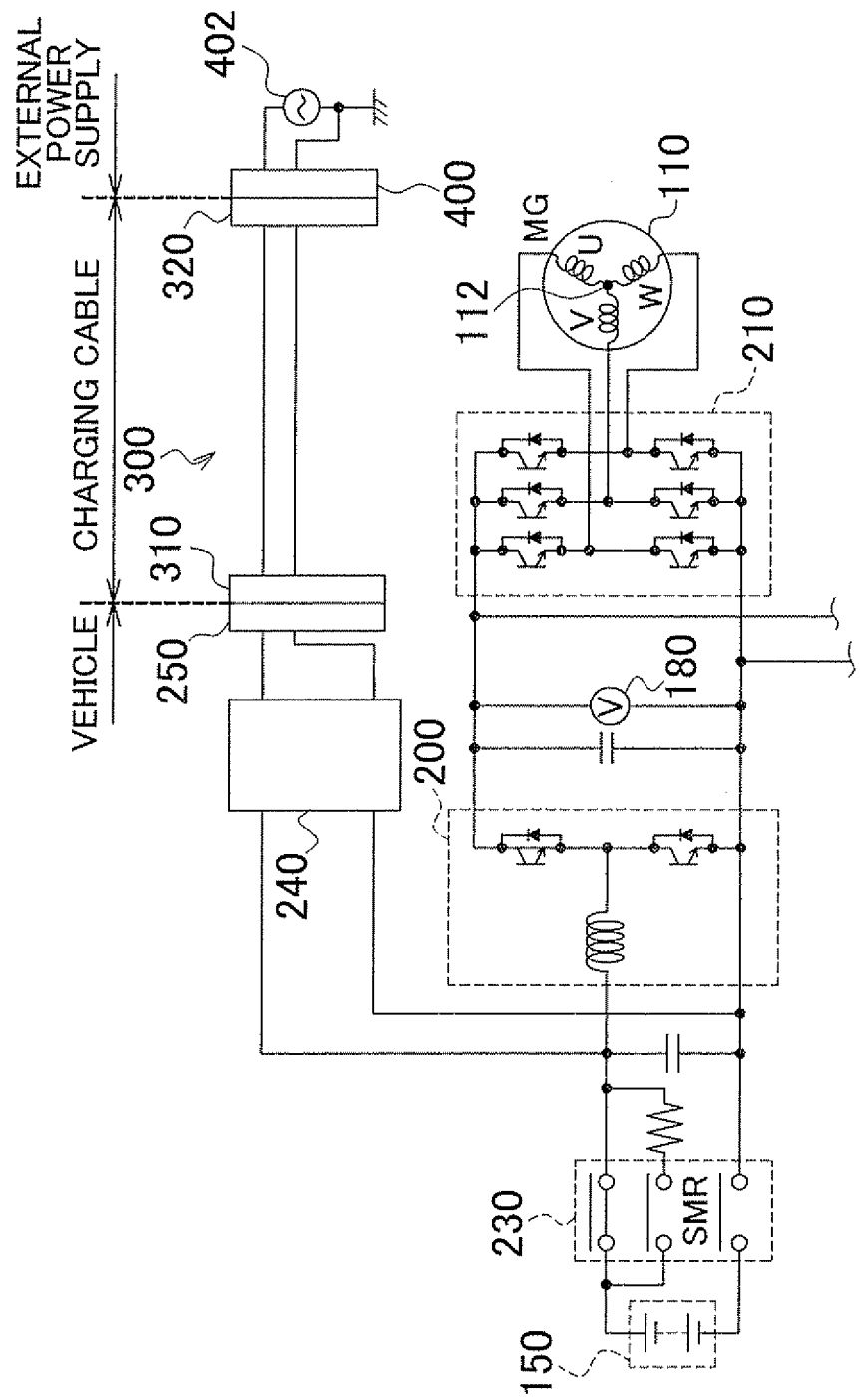
FIG. 3 is a second view of the electrical system of the plug-in hybrid vehicle according to the embodiment of the invention.

The inlet 250 is, for example, provided on the side of the plug-in hybrid vehicle. As shown in FIG. 3, a connector 310 of a charging cable 300 is connected to the inlet 250. The charging cable 300 couples the plug-in hybrid vehicle to an external power supply 402.

The charging cable 300 transfers electric power, which is to be charged into the battery 150, from the power supply 402 outside the plug-in hybrid vehicle to the plug-in hybrid vehicle. The charging cable 300 includes the connector 310 and a plug 320.

The connector 310 of the charging cable 300 is connected to the inlet 250 provided for the plug-in hybrid vehicle. The plug 320 of the charging cable 300 is connected to a wall outlet 400 provided for a house. Alternating-current power is supplied from the power supply 402 outside the plug-in hybrid vehicle to the wall outlet 400.

In the present embodiment, in a state where the plug-in hybrid vehicle is coupled to the external power supply 402 by the charging cable 300, electric power supplied from the external power supply 402 is charged into the battery 150. While the battery 150 is being charged, the SMR 230 is closed.

Figure 4:
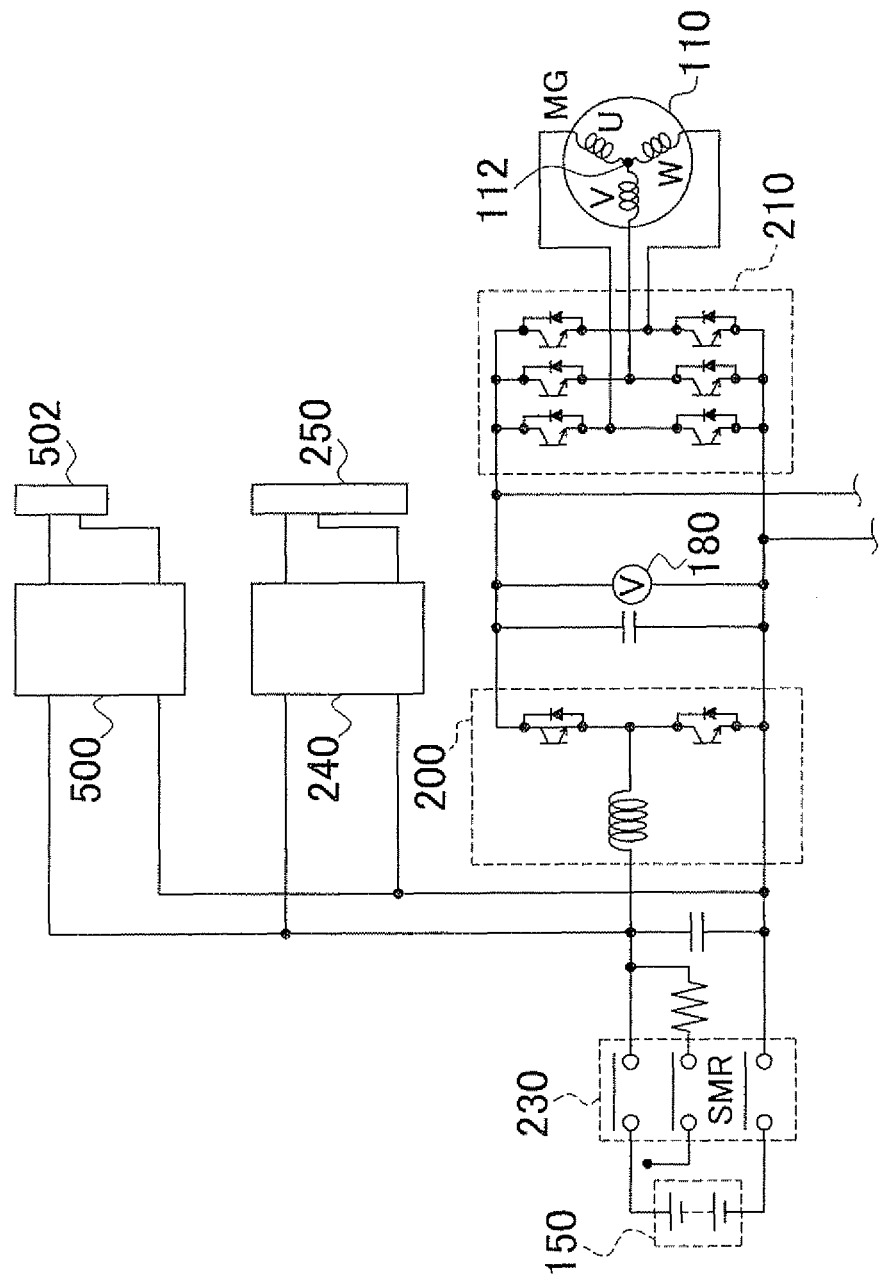
FIG. 4 is a third view of the electrical system of the plug-in hybrid vehicle according to the embodiment of the invention.

As shown in FIG. 4, the hybrid vehicle according to the present embodiment further includes an AC/DC converter circuit 500. The AC/DC converter circuit 500 is controlled by the ECU 170. The AC/DC converter circuit 500 converts direct-current power into alternating-current power. In addition, the AC/DC converter circuit 500 also functions as a step-down circuit.

Note that, instead of providing the AC/DC converter circuit 500, the charger 240 may be configured to bidirectionally convert electric power. That is, the charger 240 may be configured to convert direct-current power, generated by and supplied from the first MG 110 through the converter 200, into alternating-current power and then step down the alternating-current power.

Figure 5:
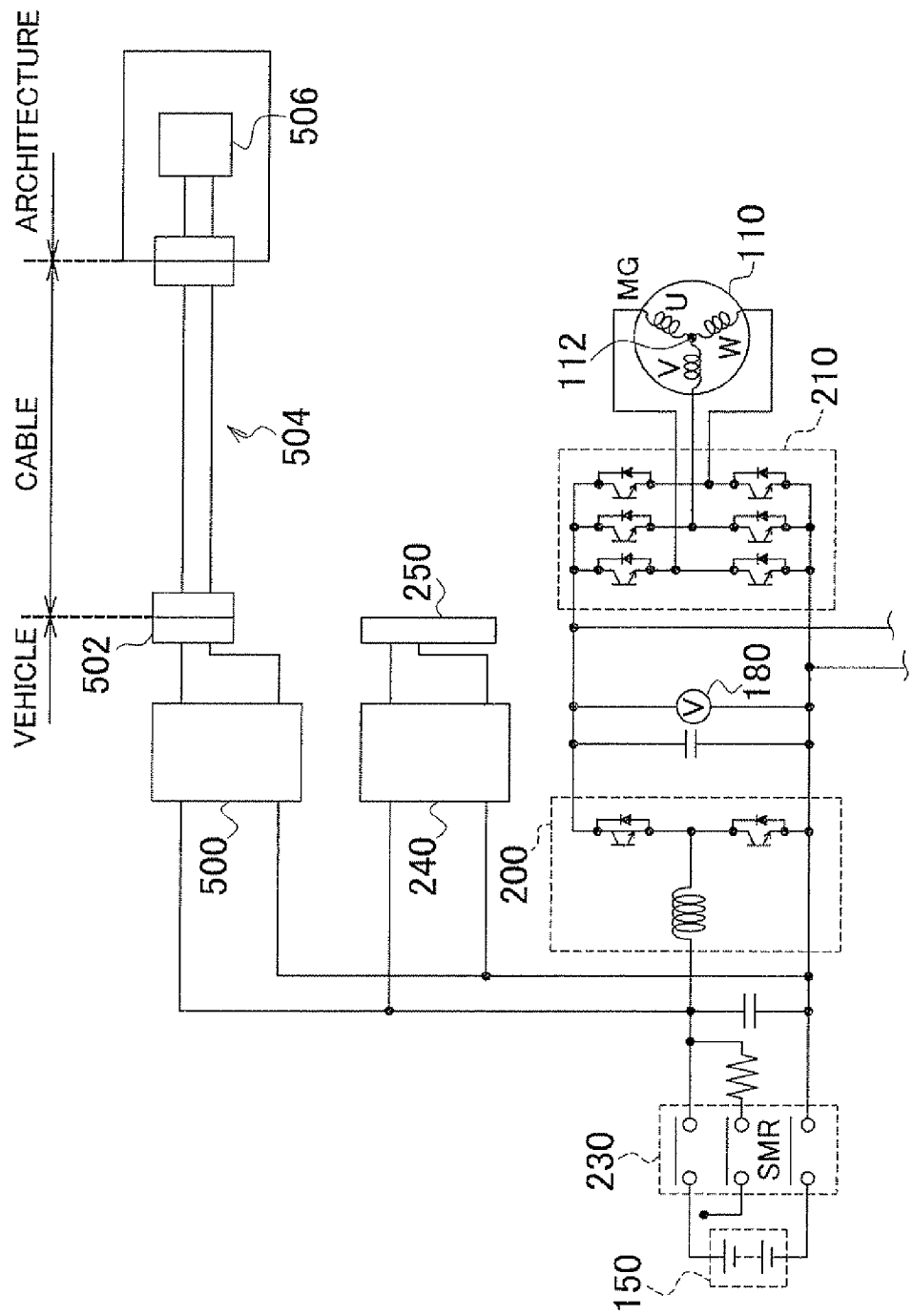
FIG. 5 is a fourth view of the electrical system of the plug-in hybrid vehicle according to the embodiment of the invention.

In the present embodiment, at least when a condition that the vehicle is stopped is satisfied, the AC/DC converter circuit 500 is controlled so as to output alternating-current power. As shown in FIG. 5, electric power output from the AC/DC converter circuit 500 may be, for example, supplied from the wall outlet 502, provided on the side, trunk, or the like, of the plug-in hybrid vehicle, to an electrical device inside an architecture, such as a house. For example, electric power is supplied from the plug-in hybrid vehicle to an external electrical device 506 via a general cable 504. Note that an exclusive cable for supplying electric power may be used. In addition, the AC/DC converter circuit 500 may be provided outside the plug-in hybrid vehicle or may be provided inside an architecture.

Furthermore, the AC/DC converter circuit 500 may not have a step-down function. The AC/DC converter circuit 500 may not be provided.

When electric power is supplied from the plug-in hybrid vehicle to the external electrical device 506 during a vehicle stop, the engine 100 is operated in order to generate electric power by the first MG 110.

Figure 6:
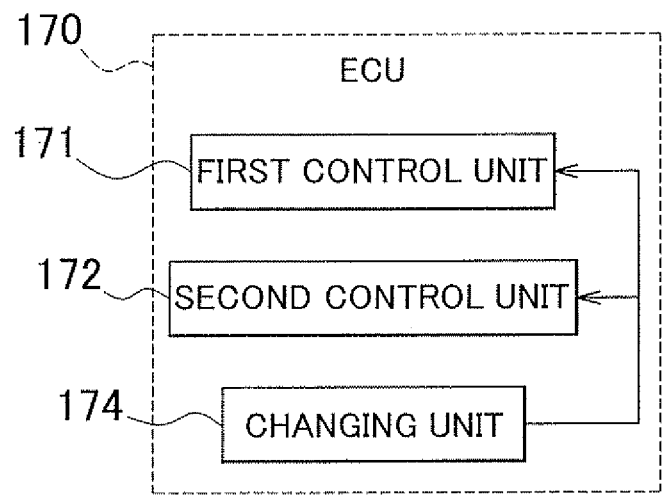
FIG. 6 is a functional block diagram of an ECU according to the embodiment of the invention.

The functions of the ECU 170 will be described with reference to FIG. 6. Note that the functions described below may be implemented by software or may be implemented by hardware.

The ECU 170 includes a first control unit 171, a second control unit 172 and a changing unit 174. The first control unit 171 controls the engine 100 in a feedback manner on the basis of the coolant temperature. More specifically, during a vehicle stop, the engine 100 is controlled so that, as a difference between the coolant temperature and a predetermined upper limit temperature increases, the operating state of the engine 100 approaches an operating state where the efficiency of the engine 100 becomes a predetermined efficiency.

Figure 7:
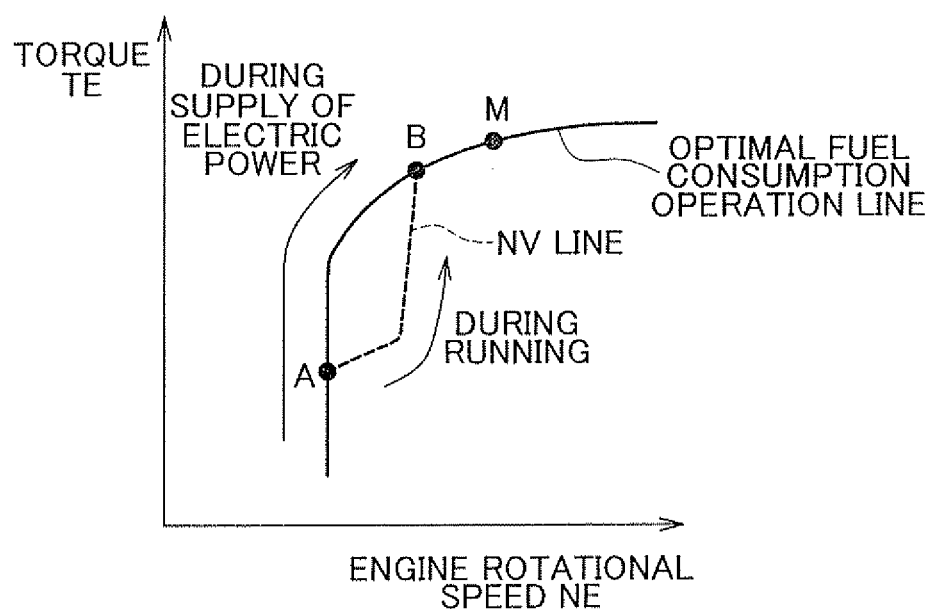
FIG. 7 is a graph that shows an operating state at which the efficiency of an engine is maximal according to the embodiment of the invention.

As shown in FIG. 7, when the coolant temperature is sufficiently lower than the upper limit temperature, the engine 100 is controlled so that the operating state (torque and engine rotational speed) of the engine 100 becomes an operating state where the efficiency becomes a maximum value indicated by "M". On the other hand, the engine 100 is controlled so that, as a difference between the coolant temperature and the upper limit temperature reduces, the power of the engine 100 decreases.

Figure 8:
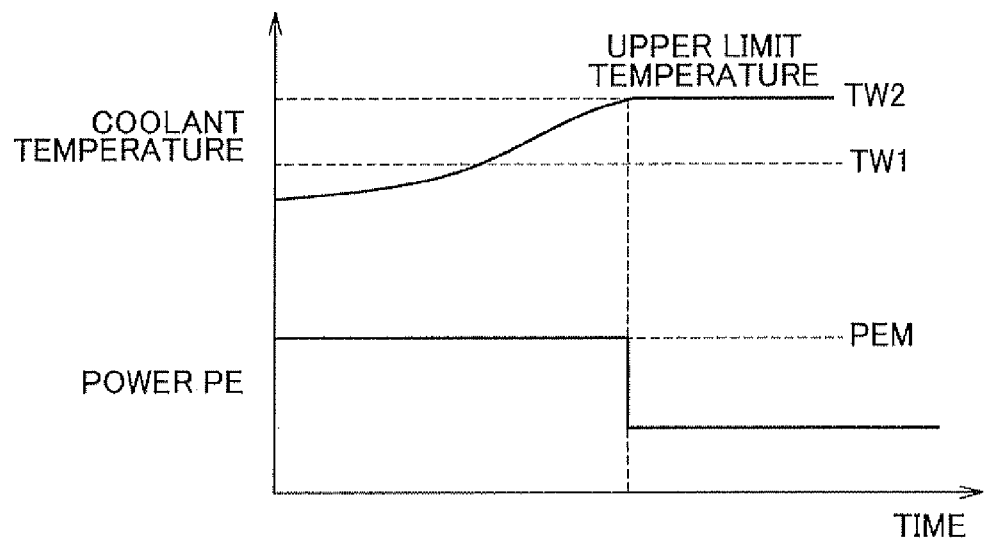
FIG. 8 is a first graph that shows a coolant temperature and an engine power PE according to the embodiment of the invention.

For example, as shown in FIG. 8, the engine 100 is controlled so that, as the coolant temperature reaches the upper limit temperature, the power PE of the engine 100 decreases from the power PEM of the engine 100 achieved by the operating state where the efficiency of the engine 100 becomes a maximum efficiency. Thus, the efficiency of the engine 100 decreases.

The amount of decrease in the power PE is, for example, determined at a value, at which the coolant temperature does not exceed the upper limit temperature, on the basis of an experiment, a simulation, or the like. Note that it is also applicable that the amount of decrease in the power PE is corrected in accordance with an ambient temperature. For example, it is also applicable that the power PE is decreased as the ambient temperature increases. In addition, when the hood of the plug-in hybrid vehicle is open, the power PE may be increased (the amount of decrease in the power PE may be reduced) as compared with when the hood is closed. Furthermore, when an external cooling device, different from a cooling device (radiator, or the like) assembled in the plug-in hybrid vehicle, is connected to the plug-in hybrid vehicle, the power PE may be increased (the amount of decrease in the power PE may be reduced) as compared with when no external cooling device is connected.

Figure 9:
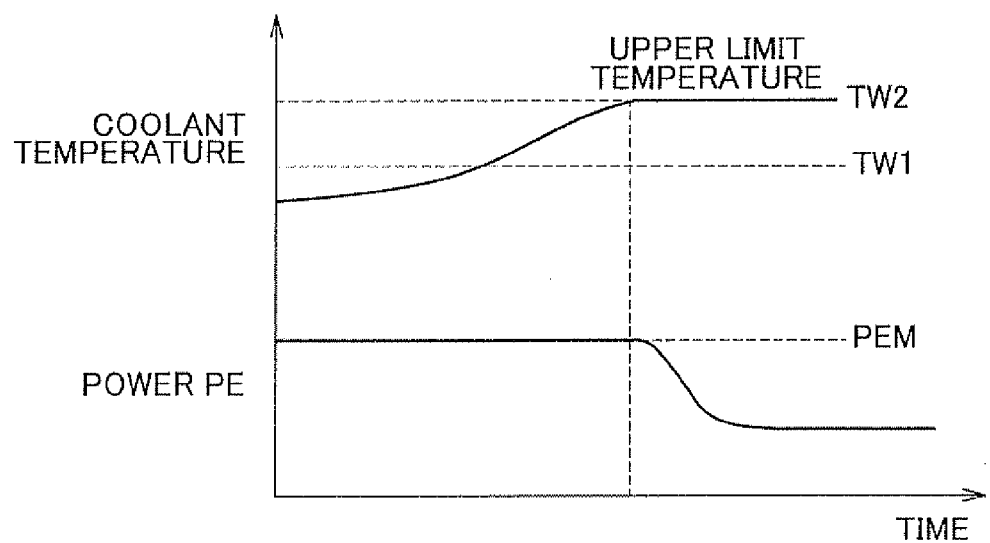
FIG. 9 is a second graph that shows a coolant temperature and an engine power PE according to the embodiment of the invention.

Furthermore, as shown in FIG. 9, the power PE may be gradually decreased. Furthermore, it is also applicable that generally known proportional control, derivative control and integral control are executed so that the power PE is decreased as a difference between the coolant temperature and the upper limit temperature reduces.

Note that the operating state of the engine 100 where the efficiency becomes a maximum value is predetermined on the basis of the results of an experiment, a simulation, or the like. For example, the efficiency is calculated for each operating state and then the operating state where the calculated efficiency is the highest is specified. The efficiency is, for example, calculated from the consumption energy calculated from a fuel consumption rate and the power of the engine 100 obtained from the results of bench testing. Note that a generally known technique may be used for a method of calculating the efficiency, so the detailed description thereof will not be repeated here.

Referring back to FIG. 7, the engine 100 is, for example, controlled so that the operating state of the engine 100 varies in accordance with a predetermined optimal fuel consumption operation line. The optimal fuel consumption operation line is obtained by connecting the operating states where the fuel consumption is optimal. That is, the optimal fuel consumption operation line indicates a condition that is determined in consideration of the fuel consumption rate of the engine 100. The optimal fuel consumption operation line is predetermined on the basis of the results of an experiment, a simulation, or the like. Note that a generally known technique may be used for a method of determining the optimal fuel consumption operation line, so the detailed description thereof will not be repeated here.

As will be described later, while the plug-in hybrid vehicle is running, the engine 100 is controlled so that the operating state varies in accordance with a noise and vibration (NV) line indicated by the dotted line between the operating state indicated by "A" and the operating state indicated by "B". However, when electric power generated by the first MG 110 is supplied to the electrical device 506 outside the plug-in hybrid vehicle during a vehicle stop, the engine 100 is controlled so that the operating state varies in accordance with the optimal fuel consumption operation line instead of the NV line.

While the plug-in hybrid vehicle is running, the second control unit 172 controls the engine 100 so that the operating sate varies in accordance with the NV line indicated by the dotted line between the operating state indicated by "A" and the operating state indicated by "B" in FIG. 7. The NV line indicates an operating state where at least one of the vibration and noise of the plug-in hybrid vehicle, produced by the engine 100, falls within an allowable range. That is, the NV line indicates a condition determined in consideration of at least any one of the noise and vibration of the plug-in hybrid vehicle.

Note that the engine 100 may be controlled so that the operating state varies in accordance with the optimal fuel consumption operation line in a range other than the range between the operating state indicated by "A" and the operating state indicated by "B".

When the plug-in hybrid vehicle is stopped and electric power generated by the first MG 110 is being supplied to the electrical device 506 outside the plug-in hybrid vehicle, the changing unit 174 increases the upper limit temperature as compared with that when the plug-in hybrid vehicle is running. As shown in FIG. 8 and FIG. 9, the upper limit temperature that is set at a temperature TW1 (TW1>0) during running of the plug-in hybrid vehicle is set at a temperature TW2 that is higher than the temperature TW1.

The temperature TW1 is determined to be somewhat low in consideration of a case where a load on the engine 100 is excessive during running of the vehicle. On the other hand, in consideration of the fact that a load on the engine 100 is less likely to be excessive while the engine 100 is driven for power generation, the temperature TW2 is set to be higher than the temperature TW1.

Figure 10:
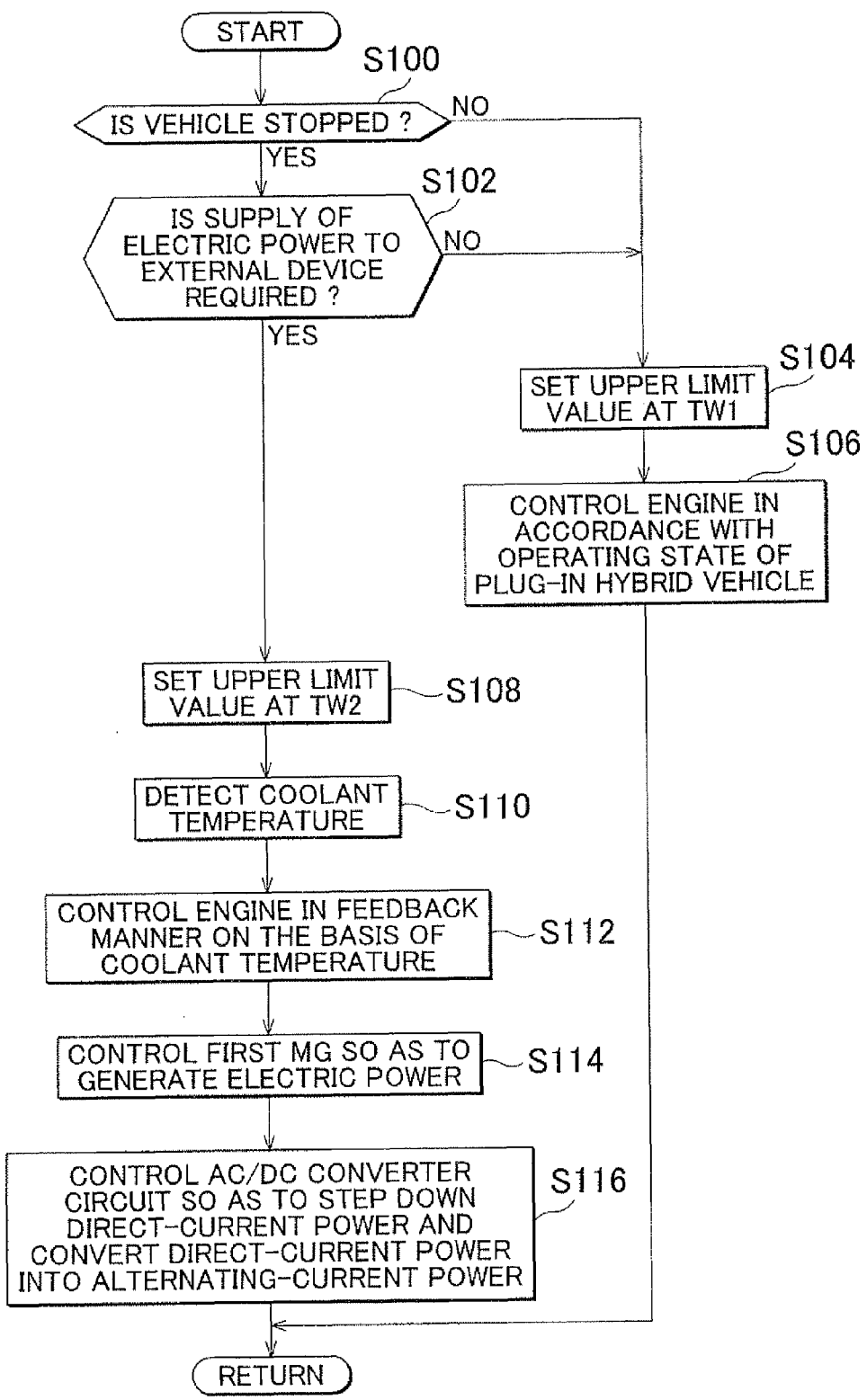
FIG. 10 is a flowchart that shows the control structure of a program executed by the ECU according to the embodiment of the invention.

A control structure of a program executed by the ECU 170 will be described with reference to FIG. 10. In step (hereinafter, step is abbreviated as S) 100, the ECU 170 determines whether the vehicle is stopped. For example, it is determined whether the vehicle is stopped on the basis of whether a vehicle speed detected by a generally known vehicle speed sensor is zero.

When the vehicle is stopped (YES in S100), the process proceeds to S102. When the plug-in hybrid vehicle is running (NO in S100), the process proceeds to S104.

In S102, the ECU 170 determines whether supply of electric power from the plug-in hybrid vehicle to the external electrical device 506 is required. For example, when a predetermined operation, such as pushing a switch, is conducted, it is determined that supply of electric power from the plug-in hybrid vehicle to the external electrical device 506 is required.

When supply of electric power from the plug-in hybrid vehicle to the external electrical device 506 is required (YES in S102), the process proceeds to S108. When supply of electric power is not required (NO in S102), the process proceeds to S104.

In S104, the upper limit coolant temperature is set at the temperature TW1. In S106, the ECU 170 controls the engine 100 in accordance with the operating state of the plug-in hybrid vehicle. When it is necessary to drive the engine 100, as described above, the engine 100 is controlled so the operating state varies in accordance with the NV line between the operating state indicated by "A" and the operating state indicated by "B" in FIG. 7. In addition, a radiator fan, or the like, is controlled so that the coolant temperature becomes lower than or equal to the temperature TW1. Note that a generally known technique may be used for a mode in which the engine 100 is controlled in the other operating range, so the detailed description thereof will not be repeated here.

In S108, the upper limit coolant temperature is set at a temperature TW2 that is higher than the temperature TW1. In S110, the ECU 170 detects the coolant temperature of the engine 100 on the basis of a signal transmitted from the temperature sensor 104.

In S112, the ECU 170 controls the engine 100 in a feedback manner on the basis of the coolant temperature. As described above, the engine 100 is controlled so that, as a difference between the coolant temperature and the upper limit temperature increases, the operating state of the engine 100 approaches an operating state where the efficiency becomes a maximum efficiency. In addition, the engine 100 is controlled so that, as a difference between the coolant temperature and the upper limit temperature reduces, the power of the engine 100 decreases.

In S114, the ECU 170 controls the first MG 110 so as to generate electric power. In S116, the ECU 170 controls the AC/DC converter circuit 500 so as to step down direct-current power converted by the inverter from alternating-current power generated by the first MG 110, convert the direct-current power into alternating-current power and then output the alternating-current power.

The control mode of the plug-in hybrid vehicle based on the above described structure and flowchart will be described.

When the plug-in hybrid vehicle is stopped (YES in S100) and supply of electric power from the plug-in hybrid vehicle to the external electrical device 506 is not required (NO in S102), the upper limit coolant temperature is set at the temperature TW1 (S104). In addition, when the plug-in hybrid vehicle is running (NO in S100), the upper limit coolant temperature is set at the temperature TW1 (S104).

In these cases, the engine 100 is controlled in accordance with the operating state of the plug-in hybrid vehicle (S106). That is, the engine 100 is controlled in accordance with driver's operation, such as accelerator operation and brake operation. When it is necessary to drive the engine 100, as described above, the engine 100 is controlled so the operating state varies in accordance with the NV line between the operating state indicated by "A" and the operating state indicated by "B" in FIG. 7. In addition, a radiator fan, or the like, is controlled so that the temperature of coolant becomes lower than or equal to the temperature TW1.

When the engine is stopped (YES in S100) and supply of electric power from the plug-in hybrid vehicle to the external electrical device 506 is required (YES in S102), the engine 100 is controlled in a feedback manner on the basis of the coolant temperature (S112). The engine 100 is controlled so that, as a difference between the coolant temperature and the upper limit temperature increases, the operating state of the engine 100 approaches an operating state where the efficiency becomes a maximum efficiency. In addition, the engine 100 is controlled so that, as a difference between the coolant temperature and the upper limit temperature reduces, the power of the engine 100 decreases.

By so doing, when the coolant temperature of the engine 100 is low, the engine 100 may be operated in an operating state that achieves a maximum efficiency. On the other hand, when the coolant temperature of the engine 100 is high, the operating state of the engine 100 may be varied so that the amount of heat emitted to coolant reduces. Therefore, it is possible to restrict an increase in coolant temperature. As a result, the engine 100 may be operated while keeping the cooling performance of the engine 100 during a vehicle stop.

In this way, when the engine is stopped (YES in S100) and supply of electric power from the plug-in hybrid vehicle to the external electrical device 506 is required (YES in S102), the power of the engine 100 is restricted to or below a power at which the efficiency becomes a maximum efficiency. Therefore, there is a small possibility that the power suddenly becomes excessive. Thus, it is less necessary to set a relatively low upper limit coolant temperature. Therefore, in this case, the upper limit coolant temperature is set at the temperature TW2 that is higher than the temperature TW1 (S108). By so doing, it is possible to expand the range within which the engine 100 is controlled so that the efficiency becomes maximum.

The first MG 110 is controlled to generate electric power (S114). Furthermore, the AC/DC converter circuit 500 is controlled so as to step down direct-current power converted by the inverter from alternating-current power generated by the first MG 110, convert the direct-current power into alternating-current power and then output the alternating-current power (S116). By so doing, supply of electric power from the plug-in hybrid vehicle to the external electrical device is possible.

The above described embodiment is just illustrative and not restrictive. The scope of the invention is defined by the appended claims rather than the above description. The scope of the invention is intended to encompass all modifications within the scope of the appended claims and equivalents thereof.

What is claimed is:

1. A control system for a vehicle that is equipped with an internal combustion engine and a generator driven by the internal combustion engine to generate electric power and that is able to supply an external device with electric power generated by the generator during a stop of the vehicle, the control system comprising:
   a detecting unit that detects a coolant temperature of the internal combustion engine; and
   an efficiency control unit that controls the internal combustion engine so that, during a stop of the vehicle, an operating state of the internal combustion engine approaches an operating state where an efficiency of the internal combustion engine becomes a predetermined efficiency as a difference between the coolant temperature and a predetermined upper limit temperature increases.

2. The control system according to claim 1, wherein
   the efficiency control unit controls the internal combustion engine so that a power of the internal combustion engine decreases as the difference between the coolant temperature and the upper limit temperature reduces.

3. The control system according to claim 2, wherein
   the efficiency control unit controls the internal combustion engine so that a power of the internal combustion engine decreases as a temperature outside the internal combustion engine increases.

4. The control system according to claim 2, wherein
   the efficiency control unit controls the internal combustion engine so that a power of the internal combustion engine increases when a hood of the vehicle is open as compared with when the hood is closed.

5. The control system according to claim 2, wherein
   the efficiency control unit controls the internal combustion engine so that a power of the internal combustion engine increases when a cooling device outside the vehicle is connected to the vehicle as compared with when no cooling device outside the vehicle is connected to the vehicle.

6. The control system according to claim 1, wherein
   the efficiency control unit controls the internal combustion engine so that a power of the internal combustion engine decreases when the coolant temperature has reached the upper limit temperature.

7. The control system according to claim 1, further comprising:
   a changing unit that increases the upper limit temperature when the vehicle is stopped and electric power generated by the generator is being supplied to a device outside the vehicle as compared with when the vehicle is running.

8. The control system according to claim 1, further comprising:
   a changing unit that increases the upper limit temperature when the vehicle is stopped and supply of electric power generated by the generator to a device outside the vehicle is required as compared with when the vehicle is running.

9. The control system according to claim 1, wherein
   the predetermined efficiency is a maximum efficiency of the internal combustion engine.

10. The control system according to claim 1, wherein
    the efficiency control unit controls the internal combustion engine so that an operating state varies in accordance with a condition determined in consideration of a fuel consumption rate of the internal combustion engine.

11. The control system according to claim 1, further comprising:
    an NV control unit that controls the internal combustion engine so that an operating state of the internal combustion engine varies in accordance with a first condition determined in consideration of at least any one of noise and vibration of the vehicle while the vehicle is running, wherein
    the efficiency control unit controls the internal combustion engine so that an operating state of the internal combustion engine varies in accordance with a second condition determined in consideration of a fuel consumption rate of the internal combustion engine instead of the first condition when the vehicle is stopped and electric power generated by the generator is being supplied to a device outside the vehicle.

* * * * *